April 12, 1927.
W. W. LANDSIEDEL
1,624,105
CALCULATING AND RECORDING MACHINE
Filed May 9, 1924    3 Sheets-Sheet 1

INVENTOR.
WALTER W. LANDSIEDEL,
BY
HIS ATTORNEYS.

April 12, 1927.

W. W. LANDSIEDEL 1,624,105

CALCULATING AND RECORDING MACHINE

Filed May 9, 1924   3 Sheets-Sheet 2

INVENTOR.
WALTER W. LANDSIEDEL,
BY Rippey Kingsland,
HIS ATTORNEYS.

April 12, 1927.
W. W. LANDSIEDEL
1,624,105
CALCULATING AND RECORDING MACHINE
Filed May 9, 1924   3 Sheets-Sheet 3
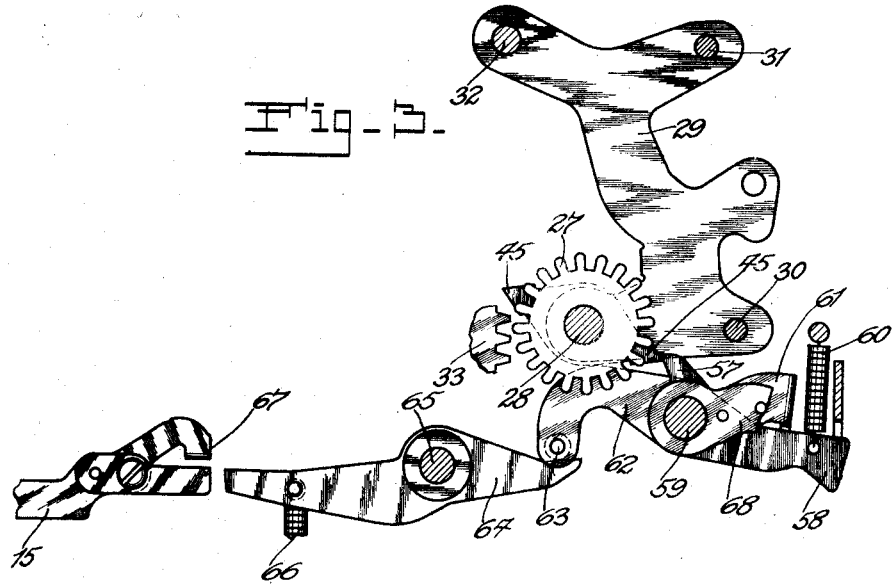
Fig-3-
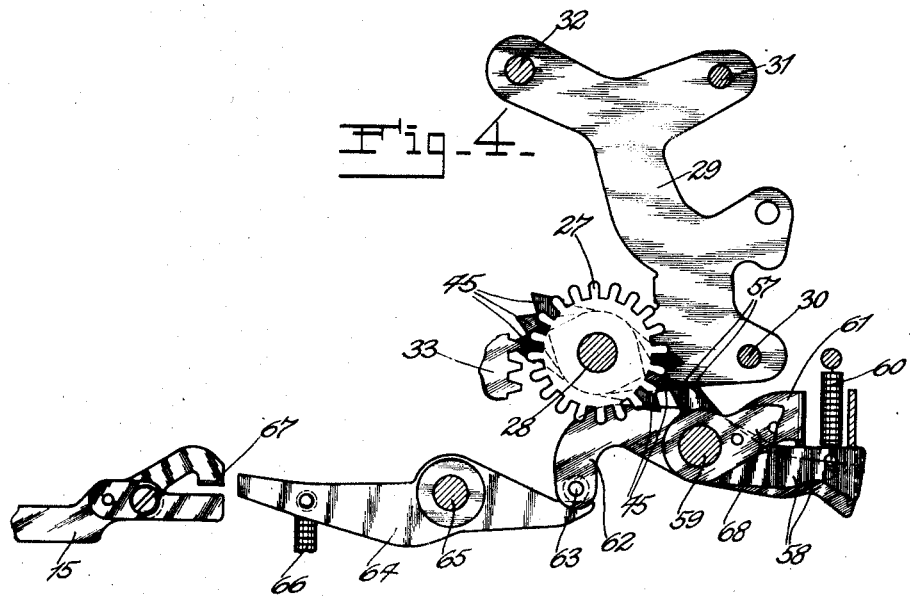
Fig-4-
INVENTOR.
WALTER W. LANDSIEDEL,
BY Rippey Kingsland
HIS ATTORNEYS.

Patented Apr. 12, 1927.

1,624,105

UNITED STATES PATENT OFFICE.

WALTER W. LANDSIEDEL, OF NORWOOD, OHIO, ASSIGNOR TO THE DALTON ADDING MACHINE COMPANY, OF CINCINNATI, OHIO, A CORPORATION OF OHIO.

CALCULATING AND RECORDING MACHINE.

Application filed May 9, 1924. Serial No. 712,033.

This invention relates to calculating and recording machines of the type used to make entries in ledgers or other books of account.

An object of the invention is to provide an improved calculating and bookkeeping machine with equipment for automatically indicating that the proper items have been passed through the machine before the machine can be cleared and made ready for other uses. In the form of the invention selected for illustration I provide a machine equipped with a number of calculating mechanisms in one of which a preceding account balance is introduced, while the other calculating mechanisms are used for performing calculations in reference to the account; and when all the calculations for the period being covered are completed and it is desired to clear the machine, the invention will render impossible such clearing operation of the calculating mechanism containing said balance account in case a certain kind of error had been made in such calculations. In this way the machine automatically proves its work and that the operator had made no error.

In the operation of the machine in making entries in ledgers, etc., the first step usually consists in "picking up," viz printing and adding, the old or last balance of the account to which an entry is to be posted, after which the debits and credits are entered, their respective amounts being added or subtracted as required, and the total thereby resulting is printed in the account as the new balance.

Errors in such operation of the machine may occur in "picking up" the old balance, or in making the entries of the debits and credits. To find such errors it is the usual practice, after all the entries have been made, to go back over the accounts to which postings were made and relist the old balances, adding to them the total of the credit items that were posted; then to relist the new balances and add to them the total of the debit items that were posted. If the sums or the totals obtained in these two operations are the same the work is proved correct; otherwise all the entries must be re-examined one by one until the error or errors are located and corrected.

The present invention is directed to the detection of errors of the class first mentioned (that is errors in "picking up" the old balance) and another object of the invention is to provide mechanism that will afford information to the operator prior to the completion of a posting when error in "picking up" the old balance has been made.

Another object of the invention is to provide means for automatically locking the total key and clearing mechanisms of the machine to prevent printing the incorrect total representing the new balance when error was made in "picking up" the old balance.

Another object of the invention is to provide means that will render the total key of the machine inoperable if an amount other than the correct amount of the old balance is "picked up," and also to provide a manually operable device for restoring said means to normal position to permit operation of the total key.

In the drawings, Fig. 1 is a side elevation of the total key locking device and associated parts as they appear embodied in a Dalton adding machine.

Fig. 2 is a plan view of one of the calculating mechanisms of the machine and the total key locking devices associated therewith.

Fig. 3 is a side elevation of the calculating mechanism and the associated total key locking device in normal or unlocked position.

Fig. 4 is a similar view showing the total key locking device in locking position.

Fig. 5 is a view showing a specimen of the work performed by the machine.

Figure 1:
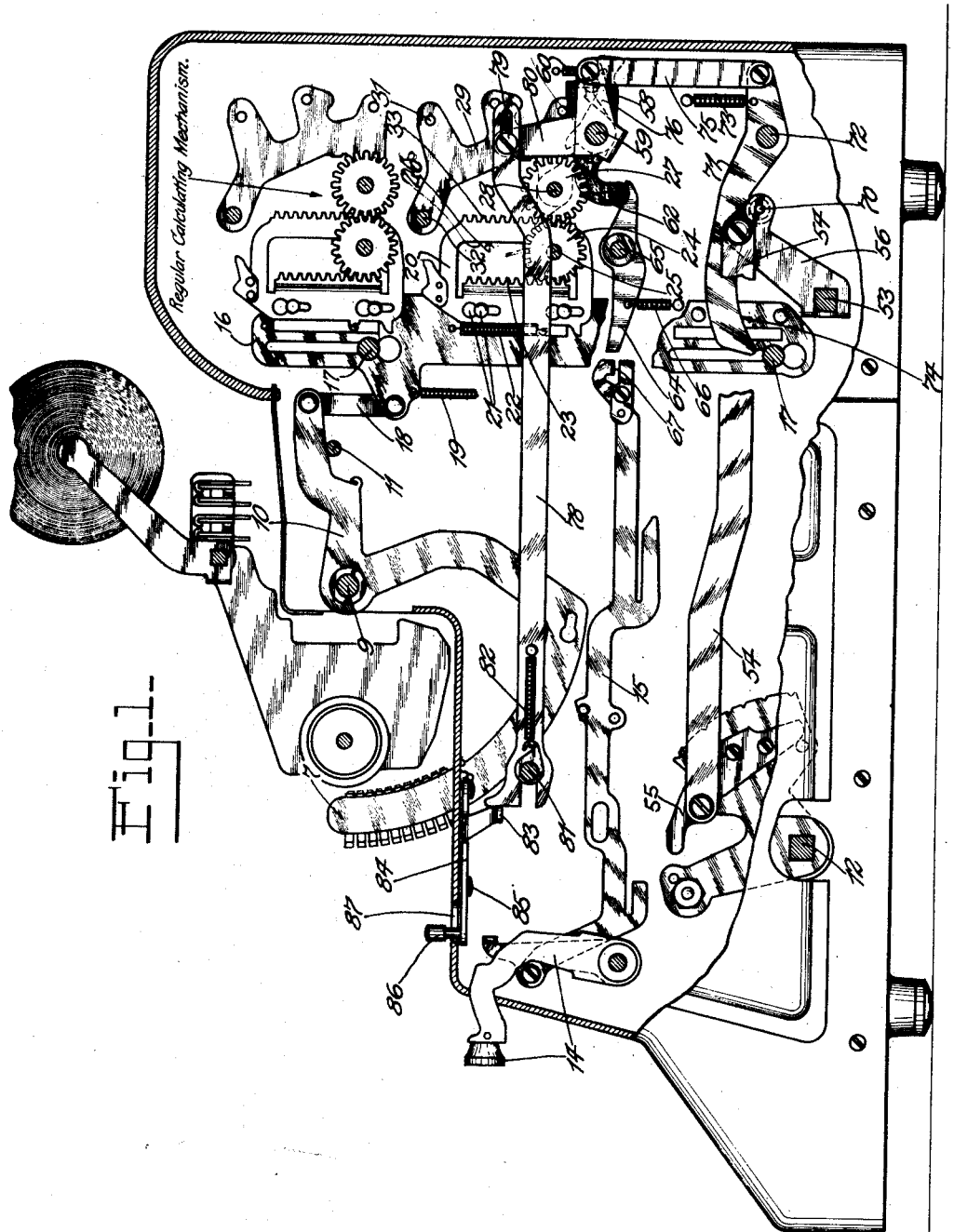

The familiar differential mechanism, numeral, keys and operating connections are omitted from the present drawings as they are not necessary to show the connection of the invention with the machine. The Dalton adding machine is constructed in substantial conformity with the disclosure of the adding and calculating mechanism in Hubert Hopkins Patent No. 1,039,130 dated September 24, 1912. Illustration of the special calculating mechanism with which the present invention directly cooperates is ample to show the connection of the invention therewith, said calculating mechanism comprising a part of the subject matter of application of Elmer H. Dreher, filed January 14, 1924, Serial No. 686,036.

The type carriers 7 are pivotally supported upon a shaft 9 and have rearwardly extended arms 10 and are normally held in their idle positions by a rod 11 which is moved downwardly and forwardly when it is desired to operate the type carriers. The movement of the rod 11 is incidental to the forward and backward turning movements of the shaft 12. The usual total key 14 and link 15 operated thereby must be operated when it is desired to print a total or to clear the machine.

The sliding actuators 16 are guided in their movements by rods 17 and are connected with the arms 10 of the type carriers 7 by links 18 so that the type carriers and slides operate in unison. Springs 19 connected at one end to the slides 16 and at the other end to a stationary part actuate the slides downwardly and the type carriers forwardly during the forward turning movement of the shaft 12 as an incident to which there is a forward and downward movement of the rod 11.

In the machine of the Dreher application, Serial No. 686,036, there are three special calculating mechanisms, only two of which are here shown. Each sliding actuator 16 supports a rack plate 20 by pin-in-slot connections 21 which permits transfer movement of the rack plates 20 independently of the supporting sliding actuator 16. Springs 22 actuate the rack plates 20 in transferring operations. Each of the rack plates 20 is formed with a rack 23 with which pinions 24 are in constant mesh. The pinions 24 are independently rotative on the shaft 25 extending transversely through slots 26 in the plates 20.

Counting pinions 27 are independently rotative on a laterally shiftable shaft 28 supported in a swinging frame comprising a pair of side members 29 rigidly connected at their lower ends by a rod 30 and at their upper ends by a rod 31 and pivotally supported at their upper ends by a rod 32.

Each of the rack plates 20 has a rack 33 thereon in lateral alinement with the rear sides of the pinions 24 which are diametrically opposite from the racks 23 with which the pinions 24 mesh. The shaft 28 is movable axially to shift the pinions 27 out of engagement with the racks 33 to engagement with the pinions 24, and vice versa. In work of straight addition the pinions 27 are in engagement with the racks 33, and in work of subtraction the pinions 27 are in engagement with the pinions 24. A trip cam 45 is rigid with each of the pinions 27.

A shaft 53 is rocked with the shaft 12 by a connection comprising a link 54 having its forward end connected to a part 55 on the shaft 12 and its rear end connected to an arm 56 on the shaft 53 (Fig. 1).

The present invention comprises mechanism directly cooperative with the special calculating mechanism and the total key connections to prevent a total printing or clearing operation of the machine if error were made in "picking up" the old balance. Pawls comprising thick ends 57 and extended tails 58 are supported on a shaft 59. Springs 60 actuate the pawls to hold the thick ends 57 adjacent to the cams 45. A bail 61 extends across and above the tail 58 of the pawls and is pivoted upon the shaft 59. An extended arm 62 of the bail has a stud 63 extending over the rear end of a block arm 64 pivoted upon a shaft 65. A spring 66 tends to lower the forward end and raise the rear end of the block arm 64. When the machine is at rest the swinging frame 29 supports the pinions 27 in the position shown in Fig. 3, out of engagement with the pinions 24 and the racks 33. When all of the pinions 27 are in zero position (Fig. 3) the cams 45 engage the pawl ends 57 and hold the tails 58 of the pawls down, permitting the bail 61 to move down with the pawls. Downward movement of the bail 61 raises the stud 63 and permits the spring 66 to draw the forward end of the block arm 64 down out of line with the projection 67 on the link 15 so as to permit operation of the total key.

The bail 61 at the end opposite from the arm 62 has an attached arm 68 supporting a lateral projection 69 (Fig. 2). The arm 56 supports a roller 70 which operates under a lever 71 pivoted upon a shaft 72 and actuated in a direction to raise its rear end by a spring 73. The lower edge of the forward part of the lever 71 is in the form of a cam 74, so that when the shaft 53 is turned forwardly the rear end of the lever 71 will be moved down. The rear end of the lever 71 is connected by a link 75 with the rear arm 76 of a bell crank lever pivoted upon the shaft 59 and having an arm 77 extending over the projection 69. Thus the moment the shaft 53 starts to turn from its starting position the lever 71 is moved by the roll 70 and the bail lever arm 77 pushes the bail 61 down, thereby moving all of the pawl ends 57 out of contact with the cams 45. This permits easy lateral movement of the shaft 28 to move the pinions 27 from position for engagement with the pinions 24 to position for engagement with the racks 33, and vice versa. The mechanism for actually moving the shaft 28 endwise for the purpose stated is not shown as it does not concern the present invention, although the mechanism just described for disengaging the pawl ends 57 from the cams 45 to permit such endwise movement of the shaft 28 is included in the present invention.

A link 78 has pin-in-slot connection 79 with an arm 80 that is in connection with the arm 76. The forward end of the link 78 is movably supported by a shaft 81 and said link is actuated in a forward direction by a spring 82. The forward end of the link 78 is in line with a projection 83 extending from a slide 84 supported for sliding movements on studs 85 within the case of the machine. A key 86 extends from the slide 84 through a slot 87 in the machine case for manual engagement to operate the slide 84. Thus, if it is desired to clear the machine when any of the cams 45 are out of zero position, that is when they are out of alinement with the pawl ends 57, it is only necessary to push the slide 84 rearwardly thereby operating the connections therefrom to depress the bail 61 which raises the arm 62 and permits the spring 66 to move the forward end of the block arm 64 out of line with the projection 67 of the total key link 15. This permits operation of the total key, after which the machine may be operated in the usual way to take a total out of the pinions 27.

Fig. 5 shows a tally roll 88 and at the right thereof a ledger sheet 89 of a form suitable for use in a machine embodying the present invention. The tally roll 88 may be moved in line spacing independently of the ledger sheet and may be retained in the machine while entries are being made on different ledger sheets.

It will be observed that nine different items or amounts have been printed on the tally roll 88 and that the ledger sheet 89 contains three lines of entries. The two upper lines of entries on the ledger sheet represent entries made at some previous time and their items have nothing to do with any of the nine items or amounts shown on the tally roll. The third row of entries on the ledger sheet represents a posting just made, and the last item on the tally roll was made in connection therewith. The eight previous amounts on the tally roll represent amounts made in connection with eight other ledger sheets to which postings had been made before the present ledger sheet 89 was inserted in the machine.

To illustrate the operation of the machine: Assume that the amount 261 34— on the tally roll and the entire lower line of entries on the ledger sheet in alinement with said amount have not been printed. With the tally roll in position to receive records the amount 261 34 is taken from the new balance column of the ledger sheet, printed on the tally roll and entered as a negative total in the pinions 27. After printing this amount upon the tally roll the paper carriage is tabulated and shifted to position in which the ledger "Mar. 8—24" and the amount 43 21 is printed and then successively to positions in which the amounts 56 70 and 76 89 are printed, said three amounts being introduced into one of the calculating mechanisms shown in the said Dreher application Serial No. 686,036, other than the proof calculating mechanism with which the pawls 57—58 cooperate. Said other calculating mechanism is hereinafter called the regular calculating mechanism. The paper carriage is then shifted to place the "Deposit" column of the ledger sheet in position to receive record, and the legend "Mar. 8—24" and the amount 100 00 are printed, the deposit being added in the regular calculating mechanism in which the three first amounts in the last line of the ledger sheet were entered as a negative total. The paper carriage is again moved to place the "Old Bal. Proof" column in printing position and the last previous balance 261 34 is again picked up from the "New Balance" column and printed and automatically added in the regular calculating mechanism in which all of the preceding amounts in the same line on the ledger sheet had been introduced.

At the same time and on the same stroke of the machine the said amount 261 34 is automatically added in the proof calculating mechanism in which the amount 261 34 was introduced as a negative total (subtracted) when it was printed upon the tally roll.

As a result of the foregoing operations there have been printed and added or subtracted in the two calculating mechanisms amounts as follows:

| Regular calculating mechanism. | Proof calculating mechanism. |
|---|---|
| 43 21— subtracted<br>56 70— subtracted<br>76 89— subtracted<br>100 00 added<br>261 34 added | 261 34— subtracted<br><br>261 34 added |
| 184 54 | 000 00 |

In the regular calculating mechanism the added amounts exceeded the subtracted amounts by 184 54, and that amount should therefore be contained or represented in the regular calculating mechanism. In the proof calculating mechanism the same amount 261 34 has been subtracted once and added once. That calculating mechanism should therefore be clear with all of the pinions 27 in zero position. If the proof calculating mechanism is clear when it moves out of engagement with the racks 33 the cams 45 (all being in zero position) will, as previously explained, depress all the pawl tails 58 permitting the bail 61 and its connections, including the block arm 64, to move so that the end of the block arm 64 will be below the total key link projection 67, leaving the total key and said link free to move as required to permit a total to be printed. The paper carriage then shifts to present the "New Balance" column in printing position in which the proof calculating mechanism, comprising the pinions 27 therein shown, will not operate. The machine is then operated to print the new balance 184 54 in the "New Balance" column, as shown.

Assuming that the foregoing operations were correctly made and the old balance 261 34 correctly picked up each time, all of the pinions 27 of the proof calculating mechanism will stand at zero and all of the pawl ends 57 will be engaged by the cams 45, and the remaining parts will be positioned to permit a total printing operation of the regular calculating mechanism.

In case error had been made in either of the two instances in which the old balance 261 34 was picked up, the proof calculating pinions 27 will not be turned to zero position on their second operation in which they operate for addition. This will leave one or more of the cams 45 out of zero position and they are so shown in Fig. 4. The cams that are out of zero position will not engage the pawl ends 57, so that the springs 60, connected with the pawls that are not engaged by the cams, will support the bail 61 which will hold the block arm 64 in line with the projection 67 to prevent operation of the total key. A total, therefore, cannot be taken, the operator finding that the total key cannot be operated. This signifies to the operator that the old balance was not picked up correctly and inspection of the old balance, as printed on the tally roll and in the "Old Bal. Proof" column, will disclose in which instance the error was made.

The error may be corrected by adding or substracting in the column in which the error occurred the amount necessary to make the correction, as a result of which the proof pinions 27 will be brought to zero position, rendering the total key and its connections operative. Or, the erroneous entry may be disregarded and the posting performed again. In order to do this it is necessary to clear both the regular and the proof calculating mechanisms which cannot be accomplished in the usual way, because of the error that had been made. The total and clearing mechanisms, however, may be rendered operative by actuating the slide 84 and the connections therefrom to operate the bail 61 to permit the springs 66 to move the block arm 64 out of the way of the projection 67. The total key and clearing mechanisms may then be operated to clear the machine preparatory to performing the operations again.

I claim:

1. A calculating machine comprising a regular calculating mechanism, a proof calculating mechanism, a set of actuators for each calculating mechanism for operating said calculating mechanisms selectively and simultaneously, a single set of movable elements for operating both sets of actuators, mechanism for controlling said calculating mechanisms in clearing operations, and means for preventing a clearing operation when error is made in the selective or simultaneous operations of one of said calculating mechanisms.

2. A calculating machine comprising a number of separate calculating mechanisms operable selectively or simultaneously in calculating and clearing operations, devices for controlling said calculating mechanisms in clearing operations, a single set of elements supporting parts of said devices for actuating said devices and mechanism for preventing operation of said devices when error has been made in calculating operation of one of said calculating mechanisms.

3. A calculating machine comprising a calculating mechanism operable in adding and subtracting operations, means for controlling said calculating mechanism in clearing operations, differentially movable recording elements controlled in their extents of movements by said calculating mechanism in clearing operations of said calculating mechanism, and means for preventing operation of said controlling means when said calculating mechanism is out of zero position.

4. A calculating machine comprising a calculating mechanism operable in adding and subtracting operations, means for controlling said calculating mechanism in clearing operations, differentially movable recording elements controlled in their extents of movements by said calculating mechanism in clearing operations of said calculating mechanism, means for preventing operation of said controlling means when said calculating mechanism is out of zero position, and optionally operable means for rendering said controlling means operative when said calculating mechanism is out of zero position.

5. A calculating machine comprising a series of actuators, a series of calculating pinions movable into and out of engagement with said actuators and operable thereby in adding, subtracting and clearing operations, mechanism for controlling said pinions in clearing operations by said actuators, differentially movable recording elements controlled in their extents of movements by said pinions in clearing operations of said pinions, and means for preventing operation of said mechanism when any of said calculating pinions is out of zero position.

6. A calculating machine comprising a series of actuators, a series of calculating pinions movable into and out of engagement with said actuators and operable thereby in adding, subtracting and clearing operations, mechanism for controlling said pinions in clearing operations by said actuators, differentially movable recording elements controlled in their extents of movements by said pinions in clearing operations of said pinions, means for preventing operation of said mechanism when any of said calculating pinions is out of zero position, and optionally operable devices for rendering said mechanism operative irrespective of whether any of said calculating pinions is out of zero position.

7. A calculating machine comprising a laterally shiftable calculating mechanism having a zero position and operative from and to said zero position in performing calculations, a clearing device controlling said calculating mechanism in clearing operations, abutment elements contacting with parts of said calculating mechanism in zero position when the machine is at rest, and mechanism for disengaging said abutment elements from said calculating mechanism as an incident to the start of and operation of the machine to permit lateral shifting of said calculating mechanism.

8. A calculating machine comprising a laterally shiftable calculating mechanism having a zero position and operative from and to said zero position in performing calculations, a clearing device controlling said calculating mechanism in clearing operations, abutment elements contacting with parts of said calculating mechanism in zero position when the machine is at rest, and an optionally operable device for disengaging said abutment elements from said calculating mechanism while the machine is at rest.

9. In a calculating machine the combination with a number of type carriers, an actuator connected with each type carrier, and an element holding said type carriers and actuators in their starting positions, of a number of calculating mechanisms selectively operable by said actuators from and to clear positions in the performance of calculations, clearing mechanism controlling said calculating mechanisms in clearing operations, and means controlled by one of said calculating mechanisms preventing operation of said clearing mechanism when said one calculating mechanism is out of clear position.

10. In a calculating machine the combination with a number of type carriers, an actuator connected with each type carrier, and an element holding said type carriers and actuators in their starting positions, of a number of calculating mechanisms selectively operable by said actuators from and to clear positions in the performance of calculations, clearing mechanism controlling said calculating mechanisms in clearing operations, means controlled by one of said calculating mechanisms preventing operation of said clearing mechanism when said one calculating mechanism is out of clear position, and optionally operable means for rendering said clearing mechanism operative irrespective of the position of said one calculating mechanism.

11. A calculating machine comprising a calculating mechanism operable from and to clear position in performance of calculations, a total key device, a block arm for preventing operation of said total key device when said calculating mechanism is out of clear position, and means under control of said calculating mechanism whereby said block arm is retained in position to prevent operation of said total key device when said clearing mechanism is out of clear position.

12. A calculating machine comprising a calculating mechanism operable from and to clear position in performance of calculations, a total key device, a block arm for preventing operation of said total key device when said calculating mechanism is out of clear position, means under control of said calculating mechanism whereby said block arm is retained in position to prevent operation of said total key device when said clearing mechanism is out of clear position, and means for moving said block arm to position to permit operation of said total key device when said calculating mechanism is in clear position.

13. A calculating machine comprising a calculating mechanism operative from and to clear position, a total key device, and mechanism for preventing operation of said total key device whenever said calculating mechansm is out of clear position.

14. A calculating machine comprising a calculating mechanism operative from and to clear position, a total key device, mechanism for preventing operation of said total key device whenever said calculating mechanism is out of clear position, and means for rendering said total key device operative when said calculating mechanism is out of clear position.

15. A calculating machine comprising separate calculating mechanisms operable selectively from and to clear position, a total key device for all of said calculating mechanisms, and means for preventing operation of said total key device when one of said calculating mechanisms is out of clear position.

16. A calculating machine comprising separate calculating mechanisms having clear positions and being operable simultaneously, a total key device for all of said calculating mechanisms, and means for preventing operation of said total key device when one of said calculating mechanisms is out of clear position.

17. A calculating machine comprising separate calculating mechanisms having clear positions and being operable simultaneously, a total key device for all of said calculating mechanisms, means for preventing operation of said total key device when one of said calculating mechanisms is out of clear position, and means for rendering said total key device operative as desired.

18. A calculating machine comprising a calculating mechanism operative from and to clear position, a total key device for said calculating mechanism, a block arm movable from and to position to prevent operation of said total key device, and means controlled by said calculating mechanism for holding said block arm in position to prevent operation of said total key device when said calculating mechanism is out of clear position.

19. A calculating machine comprising a calculating mechanism operative from and to clear position, a total key device for said calculating mechanism, a block arm movable from and to position to prevent operation of said total key device, means controlled by said calculating mechanism for holding said block arm in position to prevent operation of said total key device when said calculating mechanism is out of clear position, and means for moving said block arm to position to permit operation of said total key device.

20. A calculating machine comprising a calculating mechanism operative from and to clear position, a total key device for said calculating mechanism, a block arm for preventing operation of said total key device, an element for holding said block arm in position to prevent operation of said total key device, devices for causing said element to hold said block arm in position to prevent operation of said total key device, and means operated by said calculating mechanism for moving said last named devices to permit operation of said element and said block arm to position to permit operation of said total key device.

21. A calculating machine comprising a calculating mechanism operative from and to a clear position, a total key device for said calculating mechanism, a block arm for preventing operation of said total key device, an element for holding said block arm in position to prevent operation of said total key device, devices for causing said element to hold said block arm in position to prevent operation of said total key device, and means operated by said calculating mechanism for moving said last named devices to permit operation of said element and said block arm to position to permit operation of said total key device when said calculating mechanism is in clear position and the machine is at rest.

22. A calculating machine comprising a calculating mechanism operative to positions to represent numbers, a total key device for said calculating mechanism, and means for preventing operation of said total key device when said calculating mechanism is in position to represent a number.

23. A calculating machine comprising separate calculating mechanisms operative selectively or simultaneously to represent numbers, a total key device for all of said calculating mechanisms, and means for preventing operation of said total key device for either of said calculating mechanisms when one of said calculating mechanisms represents a number.

24. A calculating machine comprising separate calculating mechanisms operative selectively or simultaneously to represent numbers, a total key device for all of said calculating mechanisms, and means for preventing operation of said total key device for one of said calculating mechanisms when said one calculating mechanism represents a number.

25. A calculating machine comprising separate calculating mechanisms operative selectively or simultaneously to represent numbers, a total key device for all of said calculating mechanisms, and means for preventing operation of said total key device for one of said calculating mechanisms when the other calculating mechanism represents a number.

26. A calculating machine comprising separate calculating mechanisms operative selectively or simultaneously to represent numbers, a total key device for all of said calculating mechanisms, means for preventing operation of said total key device for either of said calculating mechanisms when one of said calculating mechanisms represents a number, and optional means for rendering said total key device operative.

27. A calculating machine comprising separate calculating mechanism operative selectively or simultaneously to represent numbers, a total key device for all of said calculating mechanisms, means for preventing operation of said total key device for one of said calculating mechanisms when said one calculating mechanism represents a number, and optional means for rendering said total key device operative.

28. A calculating machine comprising separate calculating mechanisms operative selectively or simultaneously to represent numbers, a total key device for all of said calculating mechanisms, means for preventing operation of said total key device for one of said calculating mechanisms when the other calculating mechanism represents a number, and optional means for rendering said total key device operative.

29. A calculating machine comprising separate calculating mechanisms operable selectively from and to clear positions, a total key device for all of said calculating mechanisms, type carriers arranged to be stopped in printing positions by either of said calculating mechanisms, a device for holding said type carriers and thereby parts of said calculating mechanisms in starting positions, and means for preventing operation of said total key device when one of said calculating mechanisms is out of clear position.

30. A calculating machine comprising separate calculating mechanisms having clear positions and being operable simultaneously, elements for operating said calculating mechanisms simultaneously, type carriers connected with and controlled by said elements, a device for holding said type carriers and thereby parts of said calculating mechanisms in starting positions, a total key device for all of said calculating mechanisms, and means for preventing operation of said total key device when one of said calculating mechanisms is out of clear position.

31. A calculating machine comprising separate calculating mechanisms having clear positions and being operable simultaneously, type carriers operatively connective with said calculating mechanisms for operation therewith and control thereby, a device for holding said type carriers and thereby parts of said calculating mechanisms in starting positions, a total key device for all of said calculating mechanisms, and means for preventing operation of said total key device when one of said calculating mechanisms is out of clear position.

32. A calculating machine comprising separate calculating mechanisms having clear positions and being operable selectively or simultaneously as desired, type carriers operatively connective with said calculating mechanisms for control thereby, a device for holding said type carriers and thereby parts of said calculating mechanisms in starting positions, and means for preventing operation of said calculating mechanisms when one of said mechanisms is out of clear position.

33. A calculating machine comprising separate calculating mechanisms operable selectively from and to clear position, type carriers, operatively connective with said calculating mechanisms for clearing operations and controlled by said mechanisms, a device for holding said type carriers and thereby parts of said calculating mechanisms in starting positions, and means for preventing clear operations of said type carriers and calculating mechanisms when one of said calculating mechanisms is out of clear position.

34. A calculating machine comprising a calculating mechanism operative from and to clear position, type carriers operatively connective with said calculating mechanism for total printing and clearing operations with and under control of said calculating mechanism, a device for holding said type carriers and thereby parts of said calculating mechanism in starting positions, a total key device controlling total printing and clearing operations of said type carriers and calculating mechanism, and means for preventing operation of said total key device when said calculating mechanism is out of clear position.

35. A calculating machine comprising a calculating mechanism operable in adding and subtracting operations respectively in opposite directions, a device for controlling said calculating mechanism in clearing operations, recording elements under control of said calculating mechanism, a device for holding said elements and thereby parts of said calculating mechanism in starting positions, and means for preventing operation of said device when said calculating mechanism is out of zero position.

36. A calculating machine comprising a regular calculating mechanism, a proof calculating mechanism, a series of plates, actuators carried by said plates for said calculating mechanisms respectively, means for operating said plates and said actuators and said calculating mechanisms simultaneously, mechanism for controlling said calculating mechanisms in clearing operations, and means for preventing a clearing operation when error is made in the selective or simultaneous operations of one of said calculating mechanisms.

37. A calculating machine comprising a number of separate calculating mechanisms operable selectively or simultaneously in calculating and clearing operations, and devices for controlling said calculating mechanisms in clearing operations and which is inoperative when error has been made in a calculating operation of one of said calculating mechanisms.

WALTER W. LANDSIEDEL.